(12) United States Patent
Ngo et al.

(10) Patent No.: US 10,558,536 B2
(45) Date of Patent: Feb. 11, 2020

(54) HIGHLY AVAILABLE STATEFUL CONTAINERS IN A CLUSTER ENVIRONMENT

(71) Applicant: DH2I Company, Fort Collins, CO (US)

(72) Inventors: Thanh Q. Ngo, Oregon City, OR (US); Samuel Revitch, Portland, OR (US)

(73) Assignee: DH2I COMPANY, Fort Collins, CO (US)

( * ) Notice: Subject to any disclaimer, the term of this patent is extended or adjusted under 35 U.S.C. 154(b) by 133 days.

(21) Appl. No.: 15/933,885

(22) Filed: Mar. 23, 2018

(65) Prior Publication Data

US 2019/0102265 A1 Apr. 4, 2019

Related U.S. Application Data

(60) Provisional application No. 62/475,380, filed on Mar. 23, 2017.

(51) Int. Cl.
| | | |
|---|---|---|
| *G06F 11/20* | (2006.01) | |
| *G06F 9/455* | (2018.01) | |
| *H04L 12/24* | (2006.01) | |
| *H04L 29/08* | (2006.01) | |

(52) U.S. Cl.
CPC ........ *G06F 11/203* (2013.01); *G06F 9/45558* (2013.01); *H04L 41/0803* (2013.01); *H04L 67/1034* (2013.01); *G06F 2009/45562* (2013.01)

(58) Field of Classification Search
CPC ............... G06F 11/203; G06F 11/2046; G06F 11/2048; G06F 11/1484; G06F 11/1466; G06F 11/3006; H04L 67/1097; H04L 67/1034; H04L 67/1036
See application file for complete search history.

(56) References Cited

U.S. PATENT DOCUMENTS

| | | | |
|---|---|---|---|
| 7,712,274 B2 | 5/2010 | Kumar | |
| 7,769,864 B2* | 8/2010 | Gebhart | ................. G06F 9/455 709/226 |
| 8,250,588 B2 | 8/2012 | Allen et al. | |
| 9,251,194 B2 | 2/2016 | Neerincx et al. | |
| 9,323,628 B2* | 4/2016 | Ngo | ................... H04L 67/1008 |
| 9,344,494 B2 | 5/2016 | Mordani et al. | |
| 2009/0037572 A1* | 2/2009 | Gebhart | ................. G06F 9/455 709/224 |

(Continued)

OTHER PUBLICATIONS

International Search Report and Written Opinion of the International Searching Authority; dated Jul. 3, 2018; PCT/US2018/023987.

*Primary Examiner* — Nadeem Iqbal
(74) *Attorney, Agent, or Firm* — Martensen IP

(57) ABSTRACT

A system for stateful containers in a distributed computing environment that includes a server cluster having a plurality of computing nodes communicatively connected via a network. Each computing node within the server cluster includes one or more virtual hosts, one or more containers operating on top of each virtual host and an application instantiation, operating on top of a container, communicatively coupled to a persistent storage medium. Each virtual host instantiates, and is tied to, a unique virtual internet protocol address that is linked to the persistent storage medium on which resides the application state data.

20 Claims, 11 Drawing Sheets

(56) References Cited

U.S. PATENT DOCUMENTS

| | | | |
|---|---|---|---|
| 2013/0185408 A1* | 7/2013 | Ngo | H04L 41/046 709/223 |
| 2014/0149784 A1* | 5/2014 | Ngo | H04L 67/1008 714/4.11 |
| 2014/0298091 A1* | 10/2014 | Carlen | H04L 65/80 714/15 |
| 2016/0080489 A1 | 3/2016 | Ngo et al. | |
| 2016/0359955 A1 | 12/2016 | Gill et al. | |
| 2016/0371127 A1 | 12/2016 | Antony et al. | |
| 2016/0378518 A1 | 12/2016 | Anthony et al. | |
| 2017/0019328 A1* | 1/2017 | Moreno | H04L 45/22 |
| 2017/0026301 A1 | 1/2017 | Keller et al. | |
| 2017/0235609 A1 | 8/2017 | Wires et al. | |
| 2017/0264684 A1 | 9/2017 | Spillane et al. | |
| 2017/0339008 A1 | 11/2017 | Dion et al. | |
| 2017/0339203 A1 | 11/2017 | Kekre et al. | |
| 2017/0366605 A1 | 12/2017 | Chang et al. | |

* cited by examiner

HIGHLY AVAILABLE STATEFUL CONTAINERS IN A CLUSTER ENVIRONMENT

RELATED APPLICATION

The present application relates to and claims the benefit of priority to U.S Provisional Patent Application No. 62/475,380 filed 23 Mar. 2017 which is hereby incorporated by reference in its entirety for all purposes as if fully set forth herein.

BACKGROUND OF THE INVENTION

Field of the Invention

Embodiments of the present invention relate, in general, to data availability for applications in a cluster environment and more particularly to stateful computing in containerized cluster environments.

Relevant Background

Applications are often deployed using multiple interconnected computers configured as a cluster. A cluster configuration can enable various benefits for the system, such as increased scalability and availability. By enabling the system to spread a load across multiple nodes of the cluster, scalability can be enhanced. For example, a cluster may be used to deploy a web application by executing a separate application instance on each node. Because each application instance is capable of handling any web request, the cluster enjoys the combined computational resources of all the nodes in the cluster. Often, the cluster includes a load-balancer that receives network requests, applies some load-balancing algorithm to decide which server instance should service the request, and forwards the request to a determined node.

Another property that cluster configurations may enhance is availability. For a web application executing in a non-clustered environment, a server failure makes the web application unavailable until the server is repaired. In contrast, cluster environments enable failover techniques, whereby, when one node fails (primary server), another node (recovery/failover server) may service the load of the failed primary node. Failover techniques strive to be implemented such that the server failure is transparent to clients.

One difficulty of implementing transparent failover for web applications is that servers often maintain data respective to each client/server interchange. The interchange of such state data is data that the server must maintain for the duration of a client's use of the application rather than for the duration of only one interchange. For example, an e-commerce web application might maintain session data indicating the items that a user has stored in his shopping cart. The system must maintain such data across multiple requests so that the user's shopping cart maintains the items, even after the user navigates to a new page. To implement transparent failover, a recovery server must have access to a client's state data.

Different methods exist for implementing transparent failover for web applications that store this type of data. In some systems, servers save such data to a persistent back-end store, such as a shared database or file system. If a server or application crashes (fails), then the recovery server may access the saved data from the shared persistent storage medium. Unfortunately, writing data related to the client/server interchanges, or state data, to shared persistent store often imposes a significant performance penalty. Furthermore, implementing a persistent store implicates additional cost and complexity.

Another technique for implementing transparent failover is in-memory replication of state data. In such systems, a server backs up its state data onto one or more other servers (backup servers) in the cluster. If the node fails, the load balancer routes the next client request to another server, which then uses some protocol to locate the backup servers and the appropriate state data. The server may either retrieve the state data from the backup servers or forward the client request to the backup servers. Whichever server handles the request also chooses one or more new backup servers to which it replicates the session data.

When state data is replicated to other servers in the cluster, different components on a single server may replicate their respective session data in a manner that is independent of one another. Therefore, different portions of the state data may be replicated to different backup servers. When one portion of the state data on a server is replicated to one backup server and another portion of the state data is replicated to another backup server, recovering from a failure of the server may require additional time and resources. A need therefore remains for the persistent storage of state data in distributed computing environments.

The availability and scalability found in cluster environments has also been enhanced by using virtual environments and application containers. A container provides for the isolation of a group of processes from the other processes on an operating system.

A container image is a lightweight, stand-alone, executable package of a piece of software that includes everything needed to run it: code, runtime, system tools, system libraries, settings. Containerized software strives to run the same, regardless of the environment in which it operates as containers isolate software from its surroundings. For example, differences between development and staging environments and the reduction of conflicts between clients running different software on the same infrastructure are enhanced by using containers. In essence a container is an abstraction at the application layer that packages code and dependencies together. Multiple containers can run on the same machine (virtual or real) and share the OS kernel with other containers, each running an isolated process.

By making use of existing operating system functionality, containers maintain their own private view of the operating system, file system structure, and network interfaces. While container share the operating system kernel with other processes they can nonetheless be constrained to some extent to use an amount of resources such as the central processing unit (CPU), random access memory (RAM), or input/output (I/O) devices. Containers have proven advantageous because they typically have a small system footprint. That is, containers provide a relatively thin encapsulation layer above and beyond any applications contained therein. Accordingly, instantiation and deployment of containers is relatively quick. Multiple containers can run on the same machine and share the operating system kernel with other containers, each running as isolated processes.

FIGS. 1A and 1B depict a typical implementation of a container. FIG. 1A shows a single container on which an application instantiation resides. One or more applications 110 can operate on top of the container 120 as instantiations 130. Similarly FIG. 1B presents implementation of containers in a distributed computing environment. In this instance a plurality of containers 120 are available for instantiation 130 of one or more applications 110. A load balancer 140 interposed between the applications 110 and the containers 120 manages the distribution of the applications 110 to the nodes within the distributed computing environment.

Virtual machines, on the other hand, tend to deploy more slowly than containers. This is due to the fact that virtual machines are a software abstraction of a physical computer. A virtual machine typically includes a guest operating system and a virtual hardware platform. These virtualized system components are not present in containers. However, virtual machines are advantageous in some instances because a higher degree of isolation and security may be achieved between virtual machines as opposed to the degree of isolation that may be achieved between containers.

The term "virtualization" has taken on many meanings in the domain of computers and operating systems as well as in storage and networking domains. Hardware (e.g., CPUs and peripherals) can be virtualized so as to "hide" the details of how to interface with the hardware from a user by adding a layer of software (e.g., an operating system). Likewise, an operating system can be virtualized so as to "hide" the details how to interface with the operating system by adding a layer of software (e.g., a hypervisor). Users can write code to perform some functions without a strong reliance on the underlying infrastructure such as a particular operating system and/or a particular vendor and/or a particular configuration of hardware.

Details pertaining to interfacing with underlying storage facilities and networking configurations can be abstracted by providing a specially configured "control" virtual machine and users can write code that runs in another "user" virtual machine. Such abstractions has given rise to very large virtualized systems comprising many hundreds or thousands of nodes and many hundreds or thousands (or millions) of user virtual machines can be configured and managed by an operator who interfaces with a configuration panel to configure said hundreds or thousands (or millions) of virtual machines.

Containers can also be deployed in virtual systems. As described above, a container can be configured to implement a particular function without reliance of a fully-configured hardware and/or software platform. For example, a container might be defined to perform some simple operation over some inputs and produce an output. In such a case, the container might be very lightweight, requiring only a way to receive the inputs, a way to perform the simple operation, and a way to provide the output. The "weight" of a hypervisor and/or an operating system is unnecessary in this case. In some cases a container might be defined to provide a somewhat more complex service, in which case the developer of the container might choose to bring some small portion of an operating system or hypervisor into the container. In such a case, the resulting container can still be lightweight vis-a-vis the alternative of bringing in the entire operating system or hypervisor. In still more situations, a group of containers might be defined and developed in such a manner that the group of containers performs as an "application". This concept can be extended to include many hundreds or thousands (or millions) of containers.

In comparison to virtual machines, which mimic independent physical machines by creating a virtual machine that runs on top of a host's operating system, containers virtualize the applications that can run in user-space directly on an operating system's kernel. Applications, such as a web server or database that run from within a container, do not require an emulation layer or a hypervisor layer to interface with the physical machine. Instead, "containerized" applications can function using an operating system's normal system calls. In this way, containers provide operating system-level virtualization that is generally faster (e.g., faster to transport, faster to "boot" or load) than virtual machines.

One reason for the broad adoption of virtualization technologies such as virtual machines or containers is the resource advantages provided by the virtual architectures. When a physical machine is limited to a single dedicated operating system the physical machine is not doing useful works during periods of inactivity. This is wasteful and inefficient if there are users on other physical machines that are currently waiting for computing resources. In contrast, virtualization allows multiple virtualized computers (e.g., VMs, containers) to share the underlying physical resources so that during periods of inactivity by one virtualized computer, another virtualized computer can take advantage of the resource availability to process workloads. This can produce great efficiencies for the use of physical devices, and can result in reduced redundancies and better resource cost management.

Despite the rapid growth and implementation of containers in distributed computing (virtual and real), when a container is removed from a machine or fails, any changes to its state that are not stored in persistent storage are lost. It is possible to store data within a container but currently data does not persist when that container is no longer running such as during failover to a new server and it can be a challenge to get data out of the container if needed by another process. The container's writable layer is currently tightly coupled to the host machine (virtual or real) where the container is running and that data is not easily moved. A need therefore exists to provide for the persistent storage of state data to maximize application availability even during periods of failover.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A system and corresponding method for stateful containers in a distributed computing environment is presented. The present invention provides high availability to stateful computing applications that run in containerized environments. "Containerized" in this case means an application that runs on a host computer, in an environment in which all of the application's program code, data, and other resources are partitioned from the rest of the system (e.g. Container). "Stateful" in this case means that the application retains a store of critical, persistent data (e.g. a database), without which the application would not be useful. "High availability" in this case means that the invention provides fault tolerance and rapid recovery for the containerized application, wherein if the server hosting the application were to fail, the invention ensures the containerized application to be restarted on another server automatically, without user intervention.

The invention can be used to decrease the recovery time objective of a mission-critical application running as a container. If the server hosting fails, instead of manually troubleshooting and restarting that server, the invention automates the process of selecting another server to immediately assume the role of running the application, including all of its persistent data, and restarting the application.

Current container environments are used to manage large numbers of applications that either (a) require no persistent data, or (b) delegate storage of persistent data to another application, e.g. a tiered web application that connects to a backend database. In general, current container environments do not support applications which require (1) retained persistent data, (2) automatic recovery, and (3) short recovery time objectives. The present invention supports the use of container environments to host applications with these requirements. The invention allows one to take a pre-packaged container application, which requires storage of persistent data, and immediately make it highly available, with a short recovery time objective in the case of a failure of the computer hosting the application.

According to one embodiment of the present invention a system for stateful containers in a distributed computing environment includes a server cluster having a plurality of computing nodes communicatively coupled via a network. Each computing node within the server cluster further includes an operating system, one or more virtual hosts, one or more containers operating on top of each virtual host and a persistent storage medium.

Each virtual host, in this embodiment, operates on top of the operating system. Moreover, each virtual host instantiates, and is tied to, a unique virtual internet protocol (IP) address. The one or more containers operate on top of each virtual host wherein each container is an abstraction that packages code and dependencies together. And one or more application instantiations operate on top of each container.

Another aspect of the invention is that a persistent storage medium is coupled to each of the computing nodes within the server cluster. Each of the one or more application instantiations process requests from a plurality of users forming a plurality of interchanges. An active interchange accesses and modifies application state data during processing of that active interchange. The virtual host through the application instantiation writes application state data relevant to the active interchange to the persistent storage medium.

The present invention operates equally well on a host operating system or a guest (virtual) operating system. Significantly, the application state data from an application instantiation written to the persistent storage medium is accessible only by the application instantiation having the current interchange and tied to the unique virtual IP address.

Each server within the distributed computing environment includes a storage monitor that maintains the states of availability of the persistent storage medium and reconfigures the persistent storage medium to satisfy additional application instantiation requirements. The storage monitor, according to one embodiment of the present invention, blocks access of application state data from other interchanges and nodes so as to preserve the authenticity and validity of each active application instantiation.

The host engine, found on each node in the server cluster, creates a virtual host and establishes for each virtual host a unique virtual IP address. Similarly an application engine creates and configures one or more containers on top of each virtual host. Finally the application engine establishes an application instantiation on top of the container. The application instantiation, the container and the virtual host are tied together to the unique virtual IP address.

A health monitor, according to one embodiment of the invention, monitors the health and status of the application instantiation and, when necessary, signals a failover or failback event. In response to a failover or failback event, the virtual host, the container and the application instantiation move to a new computing node/server within the server cluster while maintaining the unique IP address. As the unique IP address has not changed, access to application state data stored on the persistent storage medium remains.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1A:
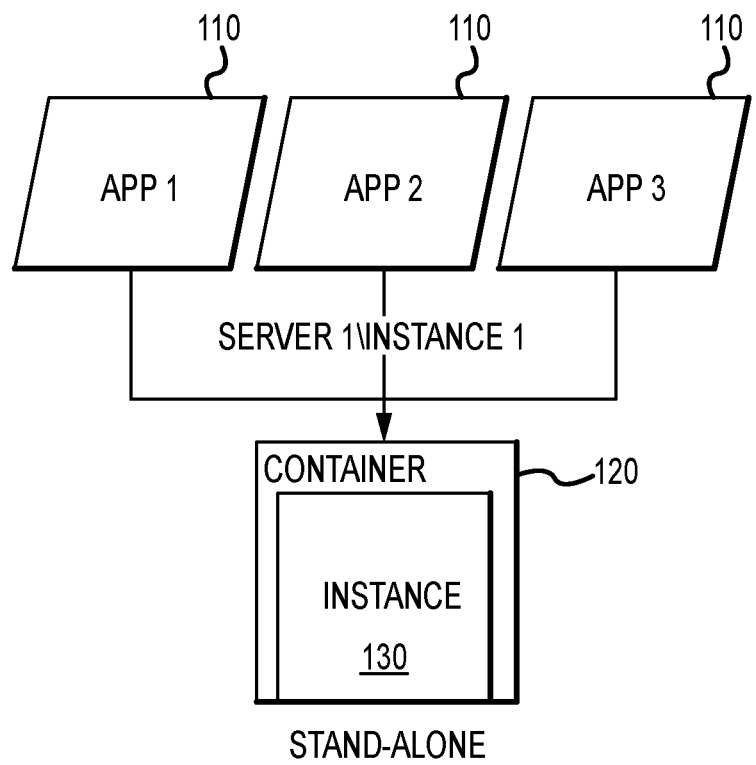
FIGS. 1A and 1B show implementation of a container with respect to the instantiation of one or more applications in a stand-alone and distributed computing environment, respectively.
Figure 1B:
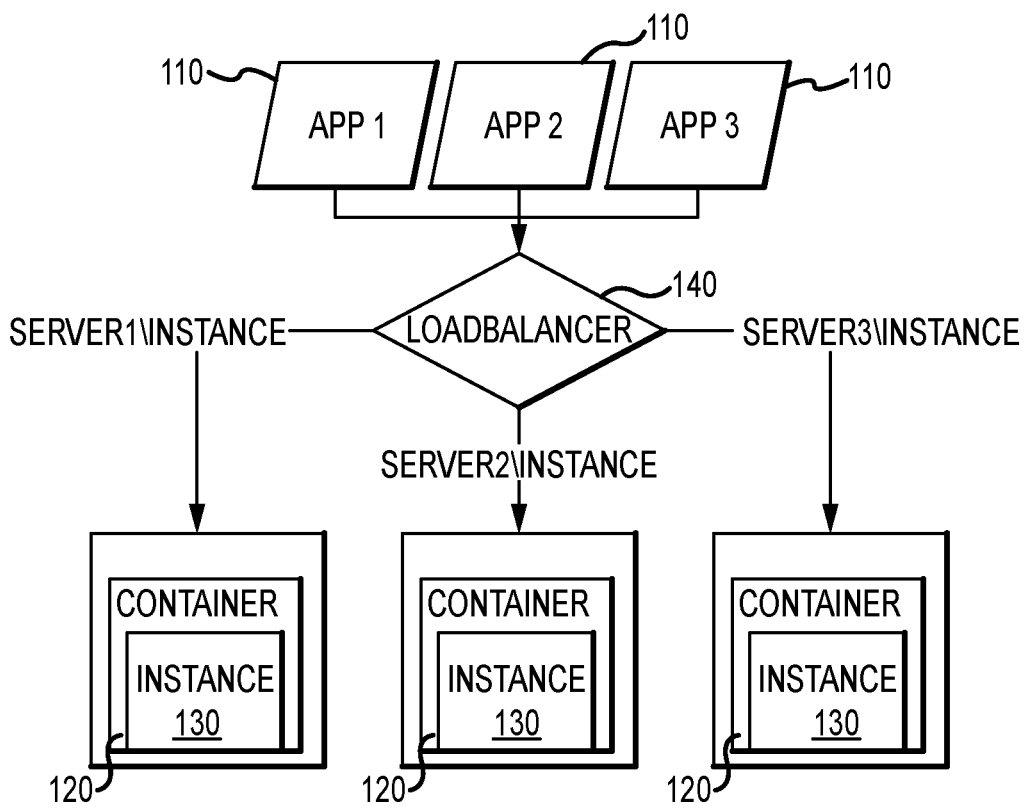

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Persistent storage of state data in a distributed computing environment is hereafter described by way of example. Current container architectures do not support persistent storage of applications state data. One embodiment of the present invention couples a persistent storage medium to each of a plurality of computing nodes forming a server cluster. Each computing node within the server cluster further includes one or more application instantiations operating on top of a container which in turn operates on top of a virtual host. The virtual host, container and application instantiation are tied to at least one unique virtual Internet Protocol (IP) address. Moreover, the application instantiation reads and writes application state data to the persistent storage medium.

Responsive to failover or fail-back of an application instantiation from one computing node in a server cluster to another computing node in the same server cluster, the application instantiation, based on movement of the tied container, virtual host and unique virtual IP address, continuously reads and writes application state data from the persistent storage medium.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

DEFINITIONS

Virtual Machine: In computing and with respect to the present invention, a virtual machine is an emulation of a computer system. Virtual machines are based on computer architectures and provide functionality of a physical computer. Their implementations may involve specialized hardware, software, or a combination of hardware and software. System virtual machines (also termed full virtualization virtual machines) provide a substitute for a real machine. They provide functionality needed to execute entire operating systems. A hypervisor uses native execution to share and manage hardware, allowing for multiple environments which are isolated from one another, yet exist on the same physical machine. Modern hypervisors use hardware-assisted virtualization, virtualization-specific hardware, primarily from the host CPUs. Process virtual machines are designed to execute computer programs in a platform-independent environment.

Container: A container is a computer program that performs operating-system-level virtualization. Containers were primary developed for Linux where it uses resource isolation features of the Linux kernel to allow independent containers to run within a single Linux instance, avoiding the overhead of starting and maintaining full virtual machines. Containers include their own library to directly use virtualization facilities provided by the Linux, (and other operating system) kernels, in addition to using abstracted virtualization interfaces. Containerized software runs the same, regardless of the environment. Containers isolate software from its surroundings.

Hypervisor: A hypervisor or virtual machine monitor is computer software, firmware or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources. This contrasts with operating-system-level virtualization, where all instances (usually called containers) must share a single kernel, though the guest operating systems can differ in user space, such as different Linux distributions with the same kernel.

Stateful: Stateful means that the computer or program keeps track of critical and persistent data regarding interaction or interchanges, usually by setting values in a storage field designated for that purpose. Stateless means there is no record of previous interactions and each interaction or interchange request has to be handled based entirely on information that comes with it.

High Availability: High availability refers to systems that are durable and likely to operate continuously without failure for a long time. The term implies that parts of a system have been fully tested and, in many cases, that there are accommodations for failure in the form of redundant components.

Server Cluster: A server or computer cluster is a set of loosely or tightly connected computers that work together so that, in many respects, they can be viewed as a single system. Computer clustering relies on a centralized management approach which makes the nodes available as orchestrated shared servers.

Daemon: In multitasking computer operating systems, a daemon is a computer program that runs as a background process, rather than being under the direct control of an interactive user. For example a system log daemon, is the daemon background process that implements the system logging facility.

Internet Protocol: Internet Protocol (IP) is the principal communications protocol used for relaying datagrams (also known as network packets) across a network using the set of communications protocols. It is generally the most popular protocol stack for wide area networks and is commonly known as TCP/IP, because of its most important protocols. IP is responsible for routing packets across network boundaries and is the primary protocol in the Internet Layer of the Internet Protocol Suite. For this purpose, IP defines datagram structures that encapsulate the data to be delivered. It also defines addressing methods that are used to label the datagram source and destination.

Small Computer System Interface: Small Computer System Interface (SCSI) is a set of standards for physically connecting and transferring data between computers and peripheral devices. The SCSI standards define commands, protocols, and electrical and optical interfaces. SCSI is most commonly used for hard disks and tape drives, but it can connect a wide range of other devices, including scanners and CD drives, although not all controllers can handle all devices. The SCSI standard defines command sets for specific peripheral device types; the presence of "unknown" as one of these types means that in theory it can be used as an interface to almost any device, but the standard is highly pragmatic and addressed toward commercial requirements.

Instantiation: In programming, instantiation is the creation of a real instance or particular realization of an abstraction or template such as a class of objects or a computer process. In other words, using Java, you instantiate a class to create a specific class that is also an executable file you can run in a computer.

In object-oriented programming, an Instance (or Instantiation) is an occurrence or a copy of an object, whether currently executing or not. Instances of a class share the same set of attributes, yet will typically differ in what those attributes contain. For example, a class "Employee" would describe the attributes common to all instances of the Employee class. For the purposes of the task being solved, Employee objects may be generally alike, but vary in such attributes as "name" and "salary." The description of the class would itemize such attributes and define the operations or actions relevant for the class, such as "increase salary" or "change telephone number." One could then talk about one instance of the Employee object with name ="Jane Doe" and another instance of the Employee object with name ="John Doe".

Also, in object-oriented programming, a class is a construct that is used as a blueprint to create instances of itself. This is referred to as class instances, class objects, instance objects, or simply objects. A class defines constituent members, which enables these class instances to have state and behavior. Data field members (member variables or instance variables) enable a class object to maintain state. Other kinds of members, especially methods, enable a class object's behavior. Class instances are of the type of the associated class.

Virtual Host: A virtual host is a logical instance isolated from its surroundings that operates on top of physical and virtual servers, and accordingly does not include an operating system. A virtual host is not a virtual machine yet performs operating-system level virtualization. Each virtual host instantiates and is tied to at least one virtual IP address. Upon failover the virtual host, including the container and application instantiation(s), migrates from one server to another server along with the its virtual IP address(es).

Description of Embodiments

Figure 2:
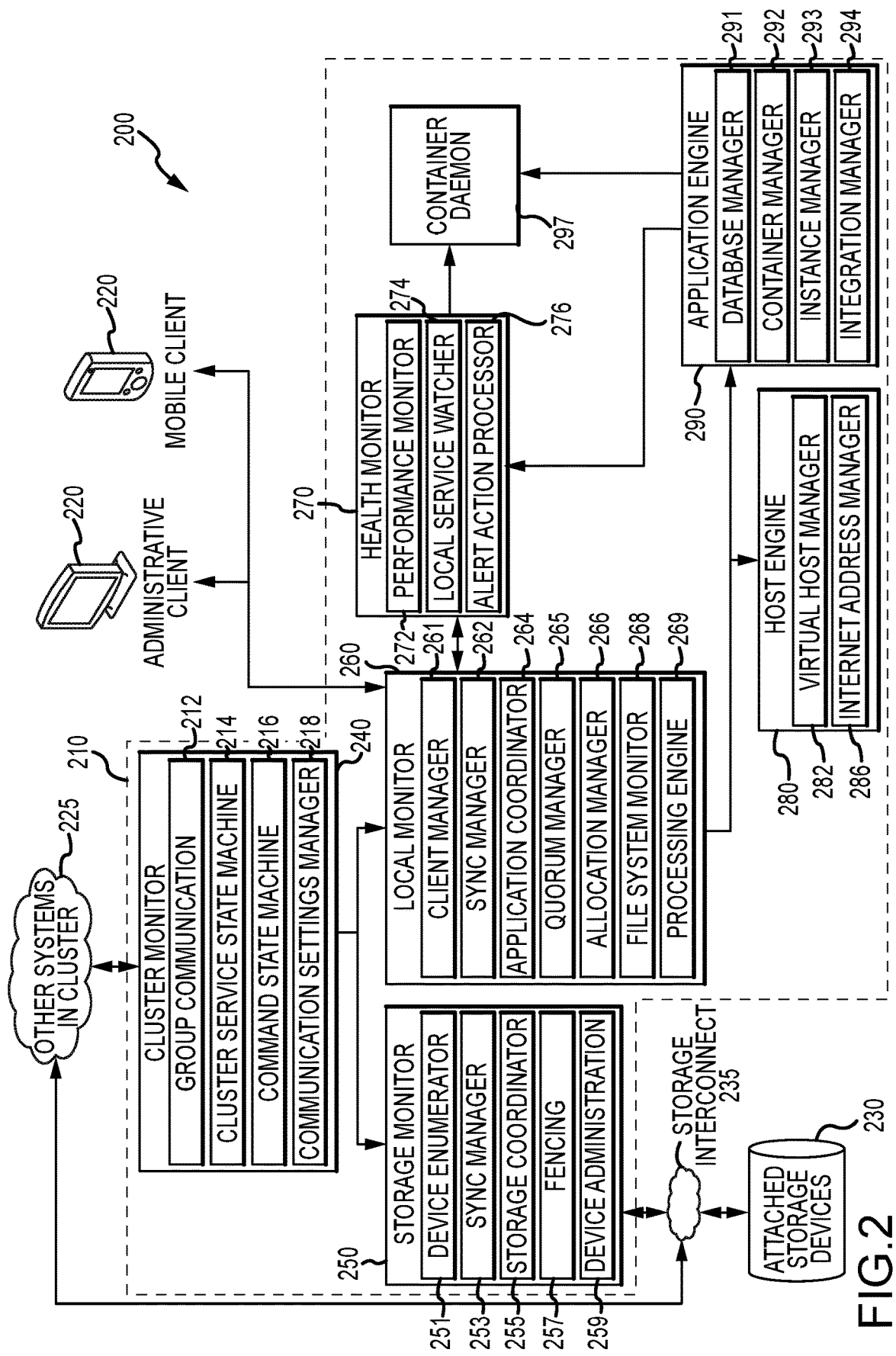
FIG. 2 shows a high level diagram of a system for stateful containers in a distributed computing environment according to one embodiment of the present invention.

A system 200 for stateful containers in a distributed computing environment is, according to one embodiment of the present invention, shown in FIG. 2. As described above, a distributed computing environment, or server cluster is a set of loosely or tightly connected computers that work together so that, in many respects, they can be viewed as a single system. Each computing node within the server cluster can be a physical machine including hardware infrastructure components on which a host operating system operates, or a virtual machine operating on top of a hypervisor. Together these computing nodes work together as a single system.

The present invention provides stateful persistent data to application instantiations in distributed computing environment such as a server cluster. Each computing node 310 within the server cluster includes components that enable the computing node 310 to interact with clients 220, other computing nodes 225 within the cluster and various attached storage devices 230, 320 via storage interconnect 235, including a persistent storage medium.

According to one embodiment of the present invention a system for stateful containers in a distributed environment, each node 310 within the cluster includes an operating system 210, a cluster monitor 240, a storage monitor 250, a local monitor 260, a health monitor 270, a host engine 280, an application engine 290 and a container daemon 297.

Figure 3:
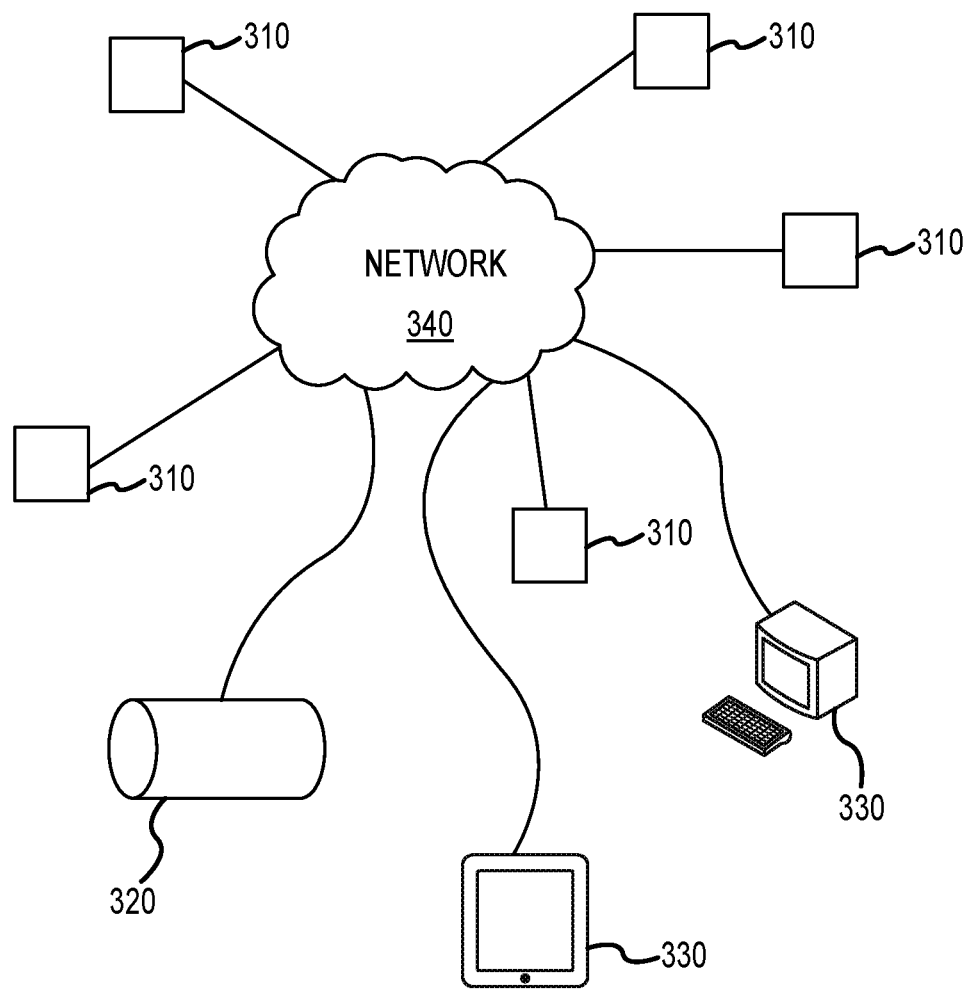
FIG. 3 is a high level view of a server cluster in which one embodiment of a system for stateful containers in a distributed computing environment is implemented.

For clarity, FIG. 3 presents a high level depiction of a server cluster in a distributed computing environment according to one embodiment of the present invention. A plurality of computing nodes 310 are communicatively coupled to each other, one or more attached storage devices/mediums 320 and clients 330 via a network 340. Each node 310 may be a physical or virtual machine and each client 330 may be a mobile device, desktop computer, terminal or the like. Similarly the network attached storage device 320 may be of various forms of network storage solutions such as SAN, SAS, SATA, iSCSI SAN, SAS RAID, NAS and the like.

Figure 4:
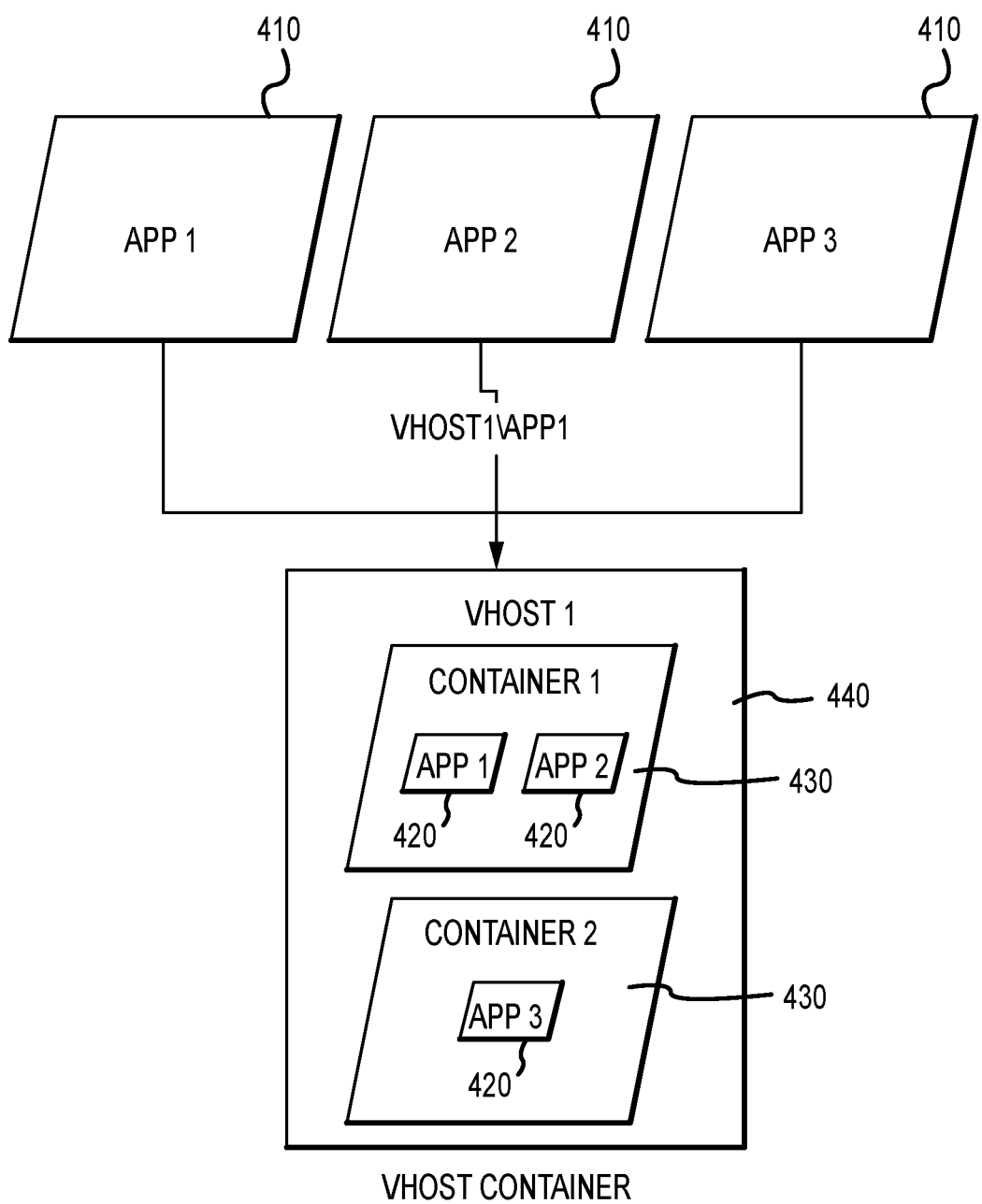
FIG. 4 is a high level depiction, according to one embodiment of the present invention, of a stand-alone for a virtual host containerized instantiation of an application.

FIG. 4 is a high level depiction of a stand-alone for a virtual host containerized instantiation of an application. As shown one or more applications 410 can be instantiated 420 on top of a container 430, which itself resides on top of a virtual host 440.

Figure 5:
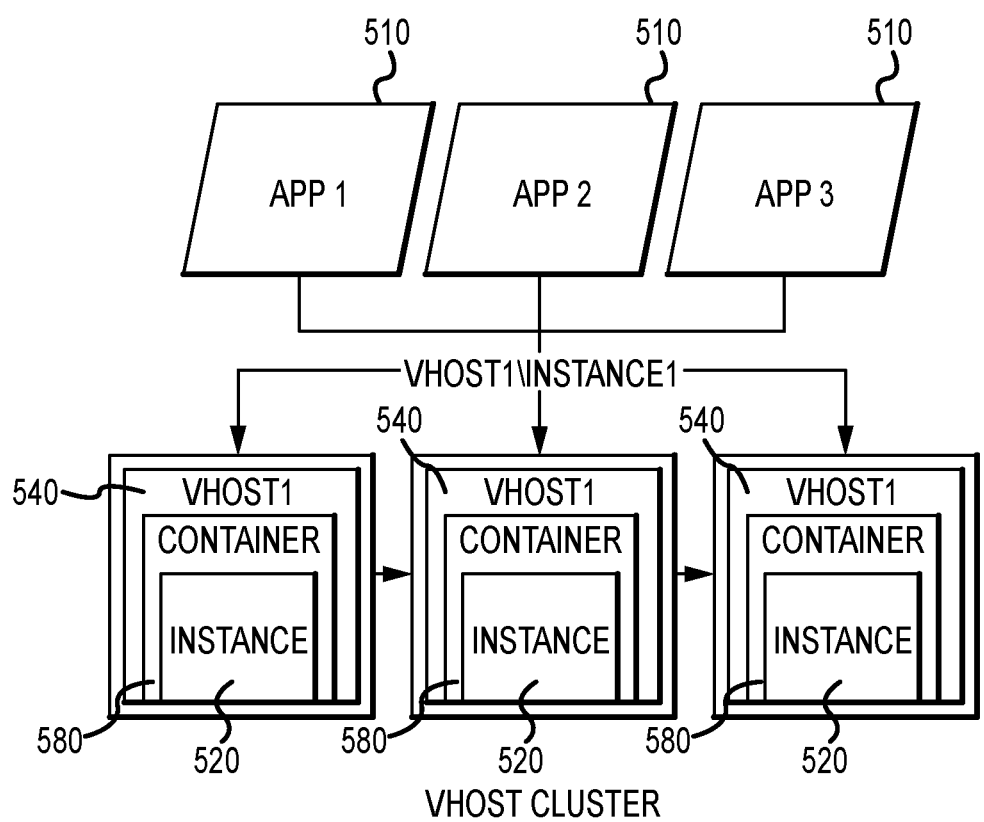
FIG. 5 is a high level depiction, according to one embodiment of the present invention, of stateful containers in a distributed computing environment.

FIG. 5 shows a high level depiction, according to one embodiment of the present invention, of stateful containers in a distributed computing environment. As with the depiction shown in FIG. 4, FIG. 5 shows, at each computing node, the instantiation 520 of one or more applications 510 on top of a container 580 that resides on top of a virtual host 540. Unlike the server clusters of the prior art, each computing node communicates with each other computing node as to its capability and availability so that upon failover a new node can accept the entirety of an instantiation operating on top of a container operating on top of a virtual host.

Turning back to FIG. 2, the host engine 280 is responsible for establishing and maintaining the one or more virtual hosts 440, 540 and the unique virtual IP address associated with and tied to each virtual host 440, 540. The host engine 280 includes subprocesses of a virtual host manager 282 which maintains and manages the virtual host and an internet address manager 286 which creates and manages virtual IP addresses for each virtual host.

The Application engine 290 is responsible for the embellishment and management of the applications residing on top of the containers. The application engine 290 includes a database manager 291 for maintaining and managing application instance database files for each instance. It also includes a container manager 292 that maintains and manages container images and an instance manager 293 maintains the instance configurations stored on disk. Lastly, the application engine includes an integration manager 294 for handling instance registration.

The container daemon 297 is responsible for running or stopping container images for each container defined by container manager 292. The container daemon 297 is also responsible for reporting whether or not a particular container 430, 580 is actively running or not when inquired by the health monitor 270.

Working closely with the application engine 290 and the container daemon 297 is the health monitor 270. The health monitor 270 is responsible for monitoring application instantiation health and signaling a failover or failback event. In computing, failover is switching to a redundant or standby computer server, system, hardware or network upon the failure or abnormal termination/operation of a previously active application, server, system, hardware, component or network. Failback is the process of restoring a system, component, or service previously in a state of failure back to its original, working state, and have a standby system go from functioning back to standby.

To monitor the health of the container daemon 297 and the application, the health monitor 270, by the performance monitor 272, monitors the CPU, memory, and I/O utilization of the system and relevant application processes. A service watcher 274 monitors service health and raises events based on registration policies. Finally an alert action processor 276 sends messages invoking scripts in response to the alerts and application conditions. The health monitor 270 watches the computing node and specifically the application instantiation for signs of failure. When failure is detected, the health monitor triggers a failover or failback condition.

A vital part of each computing node is its ability to communication with clients and other nodes. The local monitor 260 is responsible for receiving and forwarding requests from each user interface to the host engine, application engine, and cluster monitor. The local monitor 260 includes a client manager 261 that handles incoming client requests, passes client requests to the application coordinator or processing engine (described below), and maintains client connections.

The local monitor 260, through the synchronization manager 262, maintains administrative configuration of virtual hosts and applications and synchronizes configurations between systems as cluster membership changes. Another component of the local monitor 260 is the application coordinator 264 that executes cluster-wide administrative commands and maintains cluster invariants related to virtual hosts and managed applications. For example, if a system fails, and that system was hosting a particular application, the application coordinator ensures that the application is restarted on another available system.

The local monitor 260 also includes a quorum manager 265 for determining whether the active cluster has quorum based on configuration. If no quorum exists the quorum manager shuts down active applications. For example, if two sub-groups of the same cluster are able to communicate among themselves but unable to communicate with one another, they will form two independent clusters. Quorum manager 265 ensures that only one of those clusters attempts to start an application.

An allocation manager 266 monitors the set of applications active on each system, and guides automatic application placement decisions based on configured resource requirements and availability while the file system monitor 268 monitors the availability of file system paths for applications, and reports each system path state to the cluster coordinator.

Lastly each local monitor 260 includes a processing engine 269 that parses and carries out client requests by forwarding the requests to host engine, application engine, and/or sync manager.

Each computing node is further coupled to an attached storage device 230, 320 via a storage interconnect 235. A storage monitor 250, resident on each computing node maintains the state of available storage devices on each system, and reconfigures the storage devices to satisfy application requirements instantiated on that node. The storage monitor 250 includes a device enumerator 251 that maintains a list of disk and volume devices present on the local system, and actively monitors changes to that list. It also includes a sync manager 253 that maintains administrative configuration of known and managed disk devices as well as synchronizing the configuration between systems as cluster membership changes. A storage coordinator 255 executes cluster-wide administrative commands and maintains cluster invariants related to storage devices. For example, if the user requests a volume to be created, the storage coordinator will determine the best system (node) on which to create the volume, ensure that the target disk devices are made available on that system, and then forward the request to that system. A fencing tool 257 blocks access to storage devices for systems that may have previously had access, but are no longer part of the active computing node. Finally, a device administrator 259 executes device reconfiguration requests, including setting them online, offline or creating/deleting/extending/shrinking file system volumes.

The storage monitor 250 communications the state of the available storage to both the local monitor 260 and a cluster monitor 240. The cluster monitor 240 establishes and is responsible for communication with all available computing nodes participating in a cluster, monitoring each node's availability, providing virtual synchrony through its coordinator, monitoring and synchronizing the state of cluster services, and relaying commands between cluster service members. To each computing node's cluster monitor 240, a cluster service is an external software component participating in a named group. The cluster monitor 240 informs all cluster services participating in the same group of each other's presence, and any changes that may occur to that group. The local monitor 260 and storage monitor 250 components function as cluster services for a computing node and communicate that node's participation in the system (cluster).

Each cluster monitor 240 includes a group communication module 212 that establishes communication with all available systems involved in the cluster, monitoring system availability and communication channels, and electing one of the computing nodes as the overall cluster coordinator. The cluster monitor 240 also includes a cluster service state machine 214 that monitors availability of cluster services (as defined above), processes changes to the set of available cluster services, and informs active cluster service components running on each system of the current service membership. A command state machine 216 monitors the state of relay commands submitted by various cluster services and ensures consistent ordering of relayed commands and that reliable responses are sent back to the issuers of those commands. Lastly each cluster monitor includes a communications settings manager 218 that maintains administrative configuration details of the cluster, including the list of systems, their network addresses, and cryptographic secrets. The settings manager manages the process of adding and removing computing nodes in an active cluster while synchronizing configuration between systems as cluster membership changes.

The implementation of the system presented above extends container capability by making it highly available and stateful. When a container instantiates on top of a virtual host of the present invention, the container and all of its containerized application data are made highly available and stateful. If a node on which the instantiation is running fails, the invention disclosed herein will automatically fail over the virtual host onto another computing node in the server cluster and, in doing so, bring the virtual host, the container and the application instantiation back online with all of its data. in an instance of a failover, containerized applications are not required to be reconfigured to reconnect to a new instantiation of the containerized applications. They simply continue to access the existing containerized applications via the virtual host and by doing so access the state data stored in a persistent data storage device.

Included in the description are flowcharts depicting examples of the methodology which may be used for persistent storage of state data in a distributed computing environment. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Figure 6A:
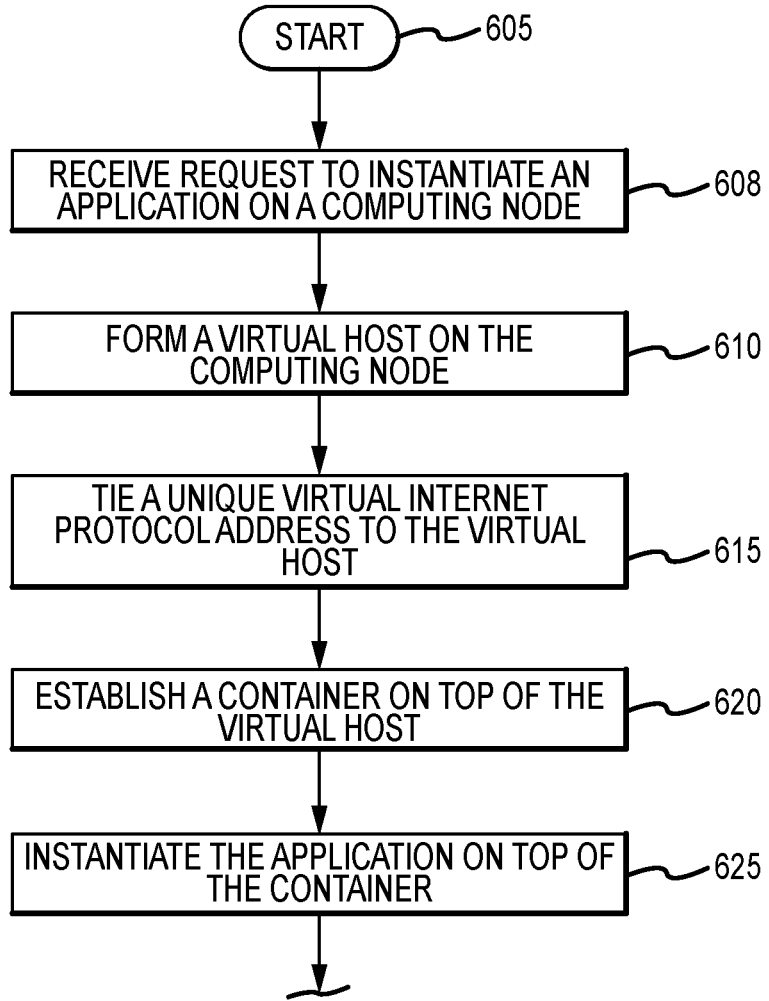
FIGS. 6A-6C form a flowchart of a method for persistent storage of state data in a distributed computing environment, according to one embodiment of the present invention.
Figure 6B:
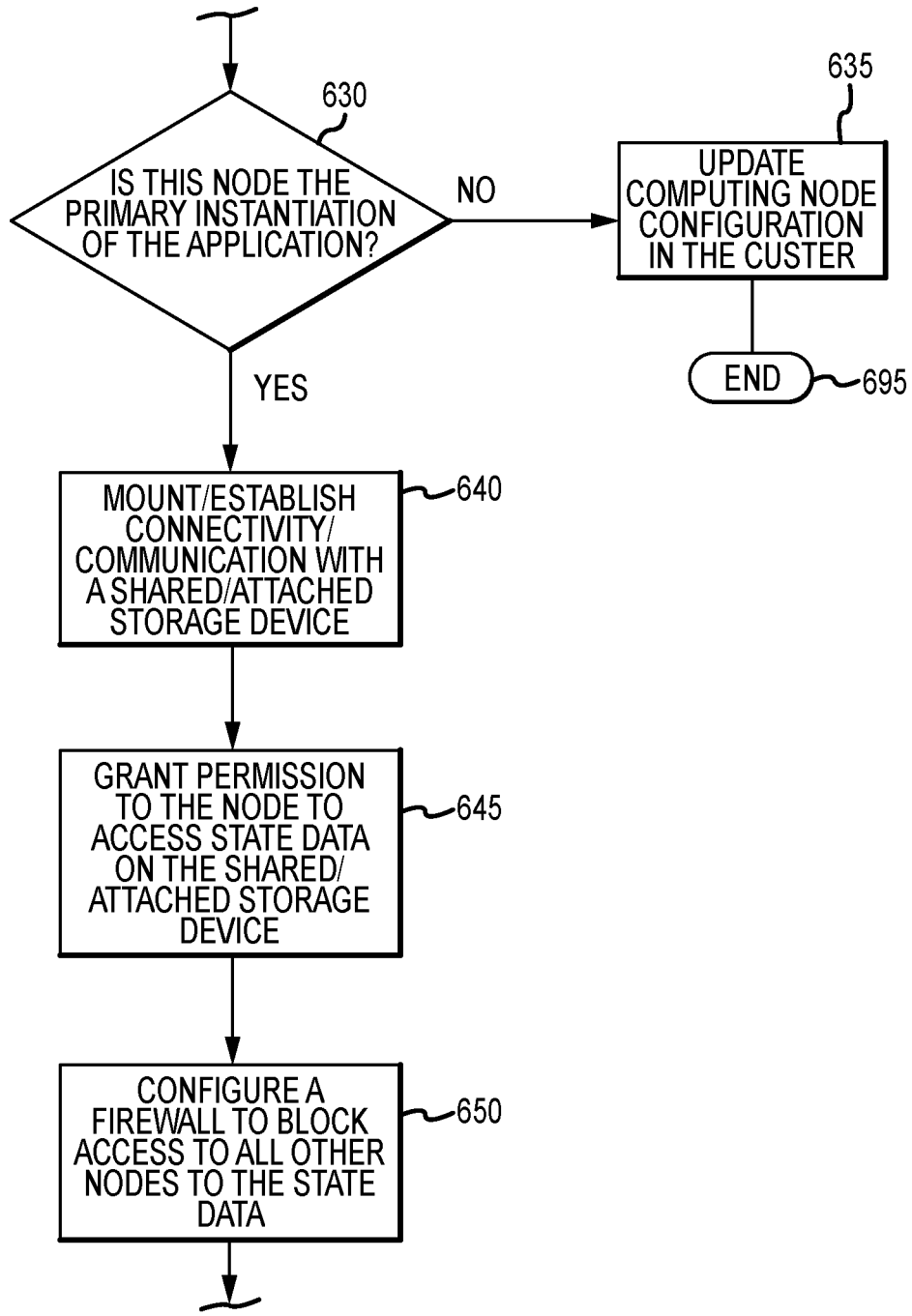
Figure 6C:
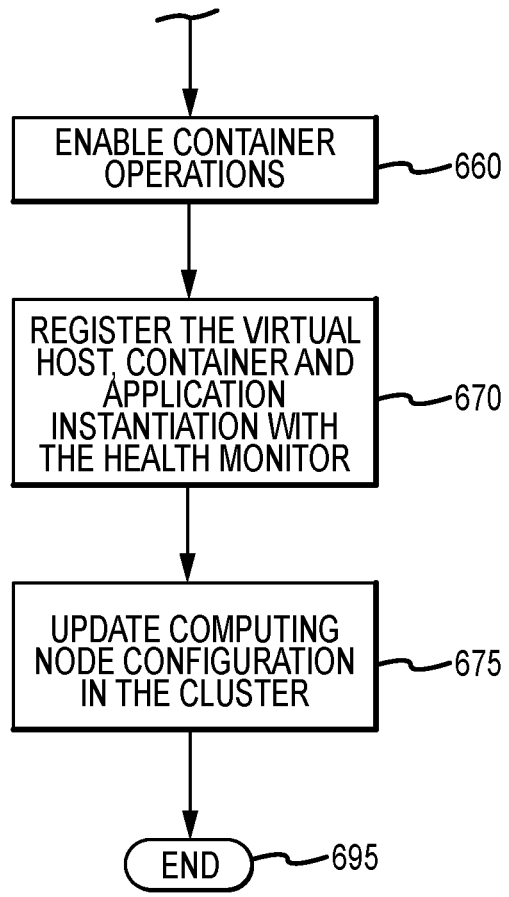

FIGS. 6A-6C form a flowchart of a method for persistent storage of state data in a distributed computing environment. The process begins 605, with receiving 608 a request to instantiate an application on a computing node within the server cluster. The request may be initiated by a user seeking to access the functionality of an application that exists in a cloud or distributed environment. Upon receiving 608 a request to establish the application, the cluster manager monitors which nodes within the cluster can meet the request. Based on the configurations of each node within the cluster, a computing node is selected on which the application will be instantiated.

On the selected computing node, one or more virtual host is formed 610 by the host engine resident on that node. Along with the formation of the virtual host, a unique IP address is tied 615 to each virtual host. The application engine on the selected node creates and configures 620 one or more containers on top of each virtual host.

With one or more containers established 620 on top of a virtual host, an instantiation 625 of the application is created on top of one of the containers. The instantiation, the container, and the virtual hose are tied to the unique IP address formed when the virtual host was created.

An inquiry 630 is made whether this computing node, and indeed the bound virtual host, container and instantiation of the application, is the primary instantiation of the application. When the answer is no, the configuration of the computing node is updated 635 in the cluster so that other nodes in the cluster are aware of that node's availability and capability.

If the answer to the inquiry is yes, connectivity and communication is established 640 with a shared/attached storage device. The device is communicatively coupled to the network and is used to store state data from the application instantiation. Once the storage device is mounted, permission 645 for the node to write and read state data to and from the stored device is granted and linked to the unique IP address tied to the virtual host.

At the same time, a firewall is established 650 to block access by all other computing nodes, virtual hosts, and containers within the server cluster to the state data of the current application instantiation. This particular sector of that storage device is reserved for read and write access to only the primary insanitation as identified by the unique IP address.

With the firewall established and access to the data storage device granted, operations of the container, and thus the application, are enabled. The computing node then registers 670 the virtual host, container and the application instantiation with the health monitor so that the node can ascertain the state of the application and if failover is required.

Lastly the status of the computing node on which the instantiation is operating is updated 675 in the cluster so that other nodes in the server cluster are aware of the new availability and capability of that node ending 695 the process.

Figure 7A:
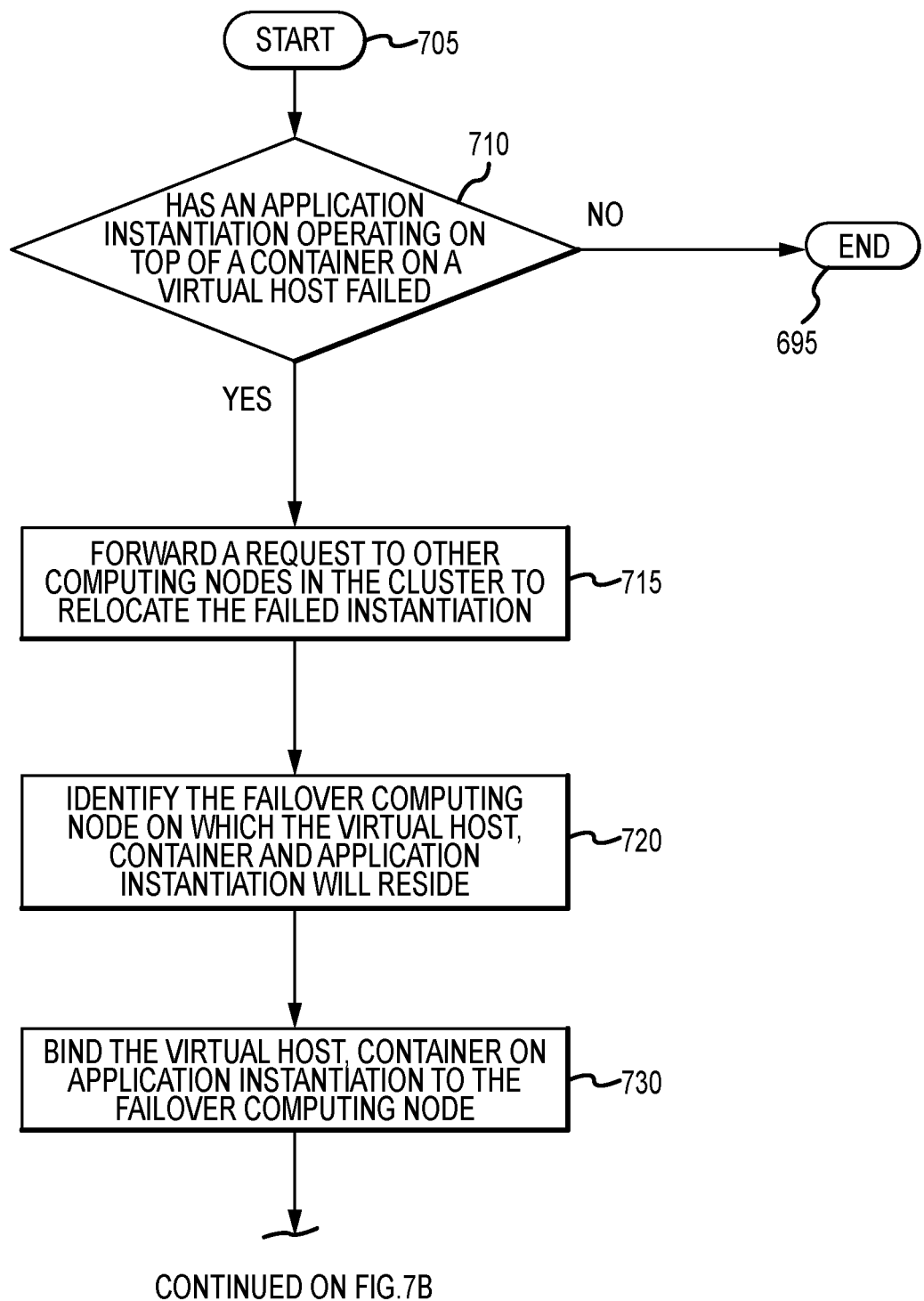
FIGS. 7A-7C form a flowchart of a method for failover of a system of stateful containers in a distributed computing environment, according to one embodiment of the present invention.
Figure 7B:
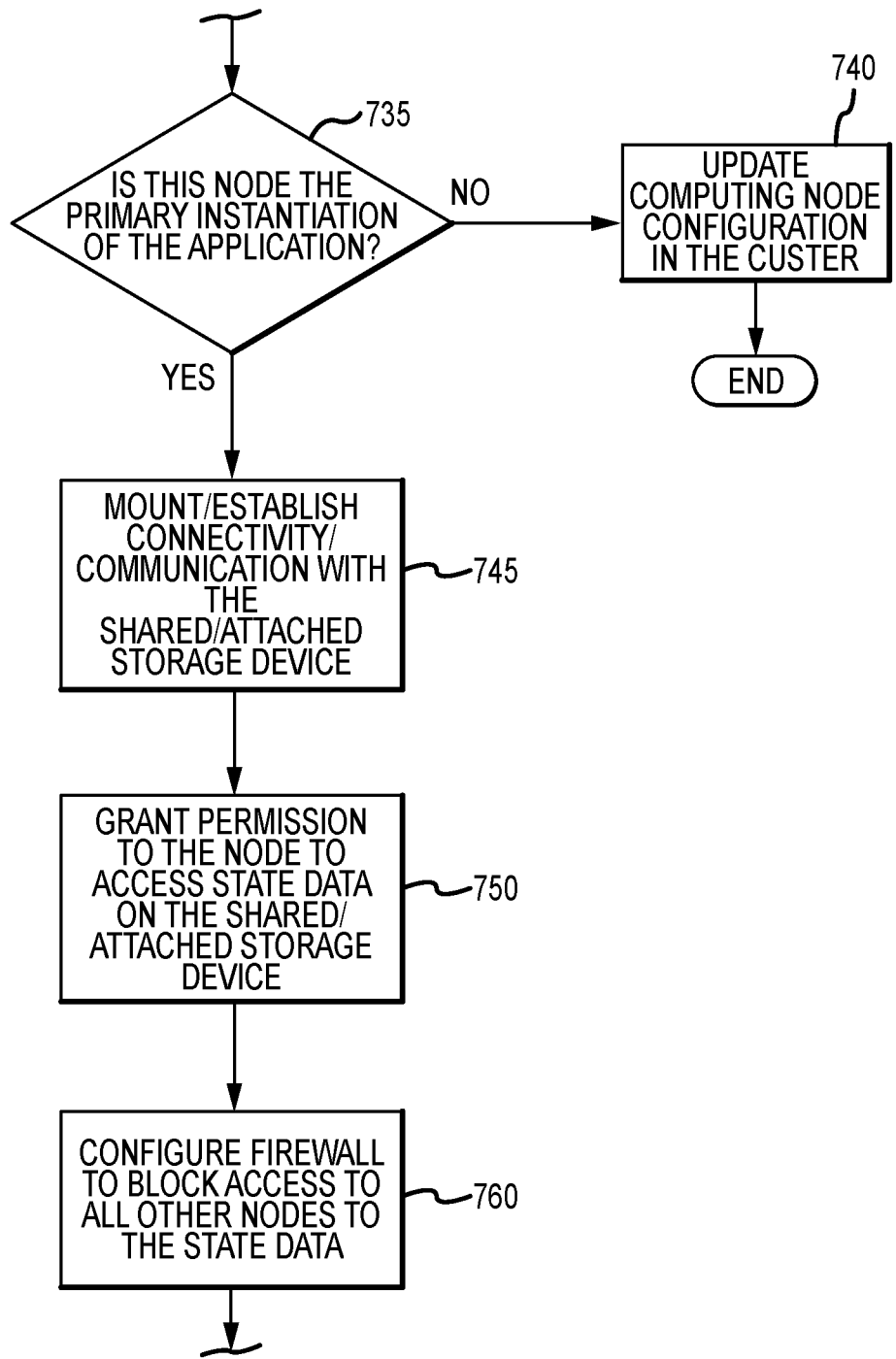
Figure 7C:
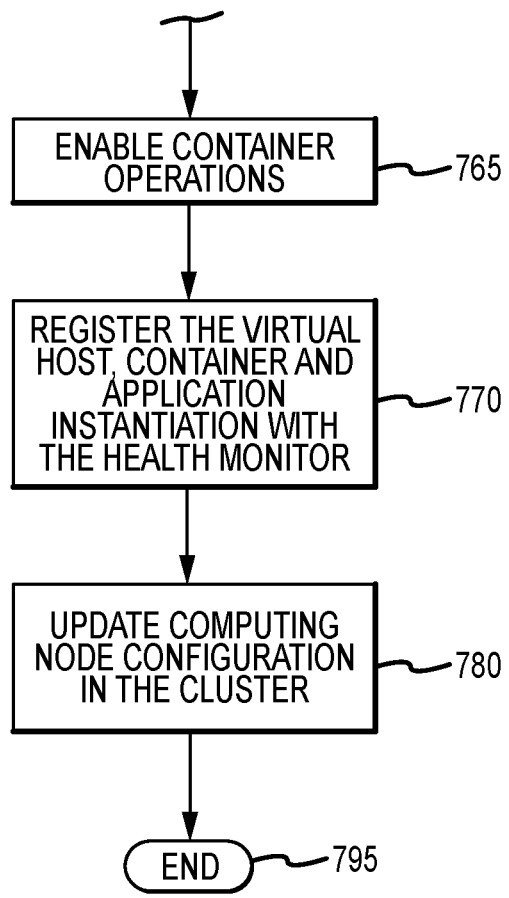

FIGS. 7A-7C form a flowchart of a method for failover of a system of stateful containers in a distributed computing environment, according to one embodiment of the present invention. As described herein, once an application is instantiated on a container, on top of a virtual host, it is registered with the health monitor resident on that computing node. The process for failover beings with an inquiry 710 of whether instantiation has failed.

If the response to the inquiry is no, meaning the instantiation continues to operate as expected, the failover process ends 795.

If the response to the inquiry is yes, a request 715 to other nodes within the cluster if forwarded to relocate the failed instantiation. The cluster monitor(s) is (are) aware of the capability and availability of each other computing node within the cluster. While beyond the scope of this description, the cluster monitor of the failing node, in concert with the other nodes, identifies 720 a failover computing node on which the virtual host, the container and the application instantiation will soon reside.

The virtual host, the container operating on top of the virtual host, and the application instantiation that is operating on top of the container, all of which are tied to the unique IP address of the virtual host, are bound 730 to the failover computing node.

Again an inquiry 735 is made as to whether this node, the failover node, is the primary instantiation node. Recall, that prior to the failover the previous node was the primary instantiation node. For completeness if the response to the inquiry is no, the computing node (the failover node) configuration is updated 740 in the cluster.

If the response to the inquiry is yes and the failover node is now the primary instantiation of the application, the storage device is mounted 745 using the unique virtual IP address to establish connectivity and communication between the application instantiation and the shared/attached storage device.

Permission to read the application state data stored on the storage device is granted 750 as is permission to write new application state data, again utilizing the unique IP address. A firewall is thereafter established 760 revoking the prior node's access and blocking all other nodes from accessing the application instantiation state data.

Operations of the container and application instantiation are resumed 765 and the virtual host, container and application instantiation are registered 770 with the health monitor of the new, failover node. Finally the failover nodes configuration relating to its availability and capability are updated 780 in the cluster ending 795 the failover process.

The present invention enables stateful failover of an application instantiation in a distributed computing environment by tying a unique virtual IP address to a virtual host. The application instantiation, operating on top of a container, operating on top of the virtual host, are similarly tied to the same unique virtual IP address. Access to storage of the state data from the application is linked with the unique IP address so that upon failover of the bound virtual host, container and application instantiation to a new node, access to the application's state data can be quickly reestablished.

Upon reading this disclosure, those of skill in the art will appreciate still additional alternative structural and functional designs for a system and a process for persistent storage of state data in a distributed computing environment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

Portions of the present invention can be implemented in software.

Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An exemplary system for implementing the invention includes a general purpose computing device such as the form of a server, conventional personal computer, a personal communication device or the like, including a processing unit, a system memory, and a system bus that couples various system components, including the system memory to the processing unit. The system bus may be any of several types of bus structures including a memory bus or memory controller, a peripheral bus, and a local bus using any of a variety of bus architectures. The system memory generally includes read-only memory (ROM) and random access memory (RAM). A basic input/output system (BIOS), containing the basic routines that help to transfer information between elements within the personal computer, such as during start-up, is stored in ROM. The personal computer may further include a hard disk drive for reading from and writing to a hard disk, a magnetic disk drive for reading from or writing to a removable magnetic disk. The hard disk drive and magnetic disk drive are connected to the system bus by a hard disk drive interface and a magnetic disk drive interface, respectively. The drives and their associated computer-readable media provide non-volatile storage of computer readable instructions, data structures, program modules and other data for the personal computer. Although the exemplary environment described herein employs a hard disk and a removable magnetic disk, it should be appreciated by those skilled in the art that other types of computer readable media which can store data that is accessible by a computer may also be used in the exemplary operating environment.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

An implementation of the present invention may also be executed in a

Web environment, where software installation packages are downloaded using a protocol such as the HyperText Transfer Protocol (HTTP) from a Web server to one or more target computers (devices, objects) that are connected through the Internet. Alternatively, an implementation of the present invention may be executing in other non-Web networking environments (using the Internet, a corporate intranet or extranet, or any other network) where software packages are distributed for installation using techniques such as Remote Method Invocation ("RMI") or Common Object Request Broker Architecture ("CORBA") or the like. Configurations for the environment include a client/server network, as well as a multi-tier environment. Furthermore, it may happen that the client and server of a particular installation both reside in the same physical device, in which case a network connection is not required.

While there have been described above the principles of the present invention in conjunction with a system for stateful containers in a distributed computing environment and method for persistent storage of state data in a distributed computing environment, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A system for stateful containers in a distributed computing environment, the system comprising:
    a server cluster including a plurality of computing nodes communicatively connected via a network wherein each computing node within the server cluster includes, an operating system,
one or more virtual hosts wherein each virtual host operates on top of the operating system and wherein each virtual host instantiates, and is tied to, at least one unique virtual internet protocol (IP) address,
one or more containers operating on top of one of the one or more virtual hosts wherein each container is an abstraction that packages code and dependencies together, and
one or more application instantiations operating on top of each container; and
a persistent storage medium coupled to each of the computing nodes within the server cluster wherein each of the one or more application instantiations process requests from a plurality of users forming a plurality of interchanges and wherein an active interchange accesses and modifies application state data during processing of the active interchange and wherein the virtual host writes application state data relevant to the active interchange to the persistent storage medium.

2. The system for stateful containers in a distributed computing environment of claim 1, wherein the operating system is either a host operating system or a guest operating system.

3. The system for stateful containers in a distributed computing environment of claim 1, wherein application state data written to the persistent storage medium is accessible only by the application instantiation having the active interchange.

4. The system for stateful containers in a distributed computing environment of claim 1, wherein each computing node includes a server cluster monitor wherein the server cluster monitor synchronizes and coordinates services throughout the server cluster.

5. The system for stateful containers in a distributed computing environment of claim 1, wherein each computing node includes a storage monitor that maintains status of availability of the persistent storage medium and reconfigures the persistent storage medium to satisfy application requirements.

6. The system for stateful containers in a distributed computing environment of claim 5, wherein the storage monitor enables write and read access to application state data available on the persistent storage medium only to the active interchange.

7. The system for stateful containers in a distributed computing environment of claim 5, wherein the storage monitor blocks access of application state data from the plurality of interchanges except the active interchange.

8. The system for stateful containers in a distributed computing environment of claim 1, wherein each computing node includes a host engine that establishes and maintains the one or more virtual hosts and each unique virtual IP address.

9. The system for stateful containers in a distributed computing environment of claim 1, wherein each computing node includes an application engine that creates and configures each container on top of the one of the one or more virtual hosts.

10. The system for stateful containers in a distributed computing environment of claim 1, wherein each computing node includes an application engine that establishes the application instantiation on top of each container.

11. The system for stateful containers in a distributed computing environment of claim 1, wherein each computing node includes a health monitor that monitors applications instantiation status and signals a failover event or a failback event.

12. The system for stateful containers in a distributed computing environment of claim 1, wherein responsive to a failover event or a failback event the one or more virtual hosts, the one or more containers and the one or more application instantiations operating on top of the one or more containers move to a new computing node while maintaining their unique virtual IP address.

13. The system for stateful containers in a distributed computing environment of claim 1, wherein each computing node includes a local monitor that receives and forwards requests from the plurality of users to appropriate application instantiation.

14. A system for persistent storage of state data in a distributed computing environment, comprising:
a server cluster including a plurality of computing nodes communicatively connected via a network wherein each computing node within the server cluster includes one or more application instantiations operating on top of a container and wherein the container operates on top of one or more virtual hosts; and
a persistent storage medium coupled to each of the computing nodes within the server cluster wherein each of the one or more application instantiations writes application state data to the persistent storage medium.

15. The system for persistent storage of state data in a distributed computing environment according to claim 14, wherein each of the one or more virtual hosts instantiates, and is tied to, a unique virtual internet protocol (IP) address.

16. The system for persistent storage of state data in a distributed computing environment according to claim 15, wherein, responsive to failover of an application instantiation associated with a virtual host and a container from a first computing node to a second computing node, the virtual host along with the container and the application instantiation remain tied to the at least one unique virtual IP address and wherein the application instantiation continuously reads and writes application state data from the persistent storage medium.

17. A computer implemented method for persistent storage of state data in a distributed computing environment wherein each of a plurality of servers in a server cluster includes a processor configured to execute instructions embodied as software that when executed comprise the steps:
forming a virtual host on top of one of the one or more servers in the server cluster wherein the virtual host instantiates, and is tied to, at least one unique virtual internet protocol (IP) address;
establishing a container on top of the virtual host;
instantiating an application on top of the container wherein instantiating includes establishing read and write communications with a persistent storage medium coupled to the one of the one or more servers in the server cluster based on the at least one unique virtual IP address to read and write application state data; and
responsive to failure of the instantiation of the application, failing over the virtual host, the container and the application instantiation to another server of the one or more servers while maintaining read and write communication of application state data stored on the persistent storage medium using the at least one unique virtual IP address.

18. The method for persistent storage of state data in a distributed computing environment of claim 17, further comprising, responsive to failure of the application instantiation, tying the virtual host to the container and the at least one unique virtual IP address and wherein the application instantiation continuously reads and writes application state data from the persistent storage medium.

19. The method for persistent storage of state data in a distributed computing environment of claim 17, further comprising monitoring application instantiation status to signal a failover event or a failback event.

20. The method for persistent storage of state data in a distributed computing environment of claim 17, further comprising limiting write and read access to application state data available on the persistent storage medium only to an active application instantiation.

* * * * *